UNITED STATES PATENT OFFICE.

OSKAR DRESSEL, OF ELBERFELD, RICHARD KOTHE, OF VOHWINKEL, AND ALFRED THAUSS, OF ELBERFELD, GERMANY, ASSIGNORS TO FARBENFABRIKEN VORM. FRIEDR. BAYER & CO., OF ELBERFELD, GERMANY, A CORPORATION OF GERMANY.

DYE.

989,953.     Specification of Letters Patent.     Patented Apr. 18, 1911.

No Drawing.     Application filed October 4, 1910. Serial No. 585,316.

*To all whom it may concern:*

Be it known that we, OSKAR DRESSEL, RICHARD KOTHE, and ALFRED THAUSS, citizens of the German Empire, residing, respectively, at Elberfeld, Vohwinkel, and Elberfeld, have invented a new Dye, of which the following is a specification.

We have found that new and valuable dyestuffs can be obtained by diazotizing the dyes:

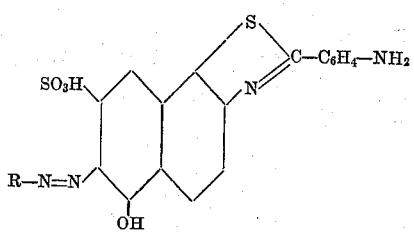

and combining the diazo compounds with naphthol sulfonic acids, new dyes are thus obtained dyeing cotton valuable shades distinguished by their good fastness to acids, even concentrated mineral acids and to the action of water.

The new dyes are after being dried and pulverized in the shape of their alkaline salts red to brownish-red powders soluble in concentrated sulfuric acid generally with a red coloration, dyeing cotton from red to bluish-red shades, yielding upon reduction with stannous chlorid and hydrochloric acid an amin, aminobenzenylthio-2.6-diamino-5-naphthol-7-sulfonic acid and an aminonaphthol sulfonic acid.

In order to illustrate the new process more fully the following example is given, the parts being by weight:—10.7 parts of orthotoluidin are diazotized and the diazo compound is added to a solution of 37.2 parts of meta-aminobenzenylthio-2.5-aminonaphthol-7-sulfonic acid containing an excess of sodium carbonate. The dye is filtered off, mixed with ice and hydrochloric acid and is then diazotized with 7 parts of sodium nitrite. The resulting diazo compound is then added to a solution of 25 parts of 1-naphthol-4-sulfonic acid containing an excess of sodium carbonate. The dye is salted out, filtered off and dried. It is after being dried and pulverized in the shape of its sodium salt a reddish-brown powder, which is soluble in water with a red coloration and soluble in concentrated sulfuric acid with a red coloration; yielding upon reduction with stannous chlorid and hydrochloric acid orthotoluidin, meta-amino-benzenylthio-2.6-diamino-5-naphthol-7-sulfonic acid and 2-amino-1-naphthol-4-sulfonic acid. It dyes cotton pure yellowish-red shades, and is probably formed according to the following formulæ:

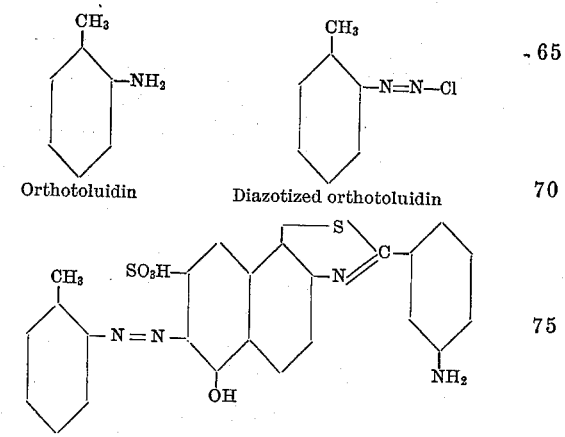

Dyestuff from orthotoluidin and metaaminobenzenylthio. 2.5. aminonaphthol-7-sulfonic acid.

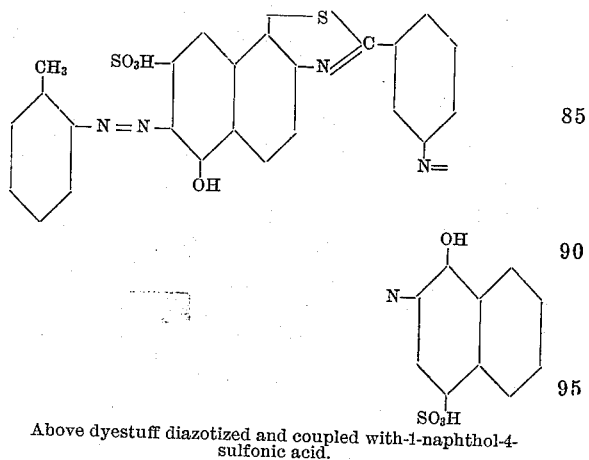

Above dyestuff diazotized and coupled with 1-naphthol-4-sulfonic acid.

Other diazo compounds, such as anilin, xylidin, naphthylamins, sulfanilic acid, etc., or other naphthol sulfonic acids, such as 1-naphthol-5-sulfonic acid, 2-naphthol-3.6-disulfonic acid, etc., may be used. On starting *e. g.* from para-aminobenzenyl-thio-2.5-aminonaphthol-7-sulfonic acid bluer dyes are obtained.

We claim:—

1. The herein described new dyestuffs obtainable by reacting with the diazotized azo coloring matter obtainable from an aromatic amin and aminobenzenylthio-2.5-aminonaphthol-7-sulfonic acid upon a naphthol sulfonic acid, which dyestuffs are after being dried and pulverized in the shape of their alkaline salts, red to brownish-red powders soluble in concentrated sulfuric acid generally with a red coloration; dyeing cotton from red to bluish-red shades; and yielding upon reduction with stannous chlorid and hydrochloric acid an amin, aminobenzenylthio-2.6-diamino-5-naphthol-7-sulfonic acid and an aminonaphthol sulfonic acid, substantially as described.

2. The herein described new dyestuff obtainable by reacting with the diazotized azo coloring matter obtainable from diazotized ortho-toluidin and meta-aminobenzenylthio-2.5-aminonaphthol-7-sulfonic acid upon 1-naphthol-4-sulfonic acid, which dyestuff is after being dried and pulverized in the shape of its sodium salt a reddish-brown powder; soluble in water with a red coloration; soluble in concentrated sulfuric acid with a red coloration; yielding upon reduction with stannous chlorid and hydrochloric acid ortho-toluidin, meta-aminobenzenylthio-2.6-diamino-5-naphthol-7-sulfonic acid and 2-amino-1-naphthol-4-sulfonic acid; and dyeing cotton pure yellowish-red shades, substantially as described.

In testimony whereof we have hereunto set out hands in the presence of two subscribing witnesses.

OSKAR DRESSEL. [L. S.]
RICHARD KOTHE. [L. S.]
ALFRED THAUSS. [L. S.]

Witnesses:
CHAS. J. WRIGHT,
WALTER VONNEGUT.

---

Copies of this patent may be obtained for five cents each, by addressing the "Commissioner of Patents, Washington, D. C."